Dec. 28, 1948.  W. D. HERSHBERGER  2,457,673
MICROWAVE GAS ANALYSIS
Filed Nov. 1, 1945
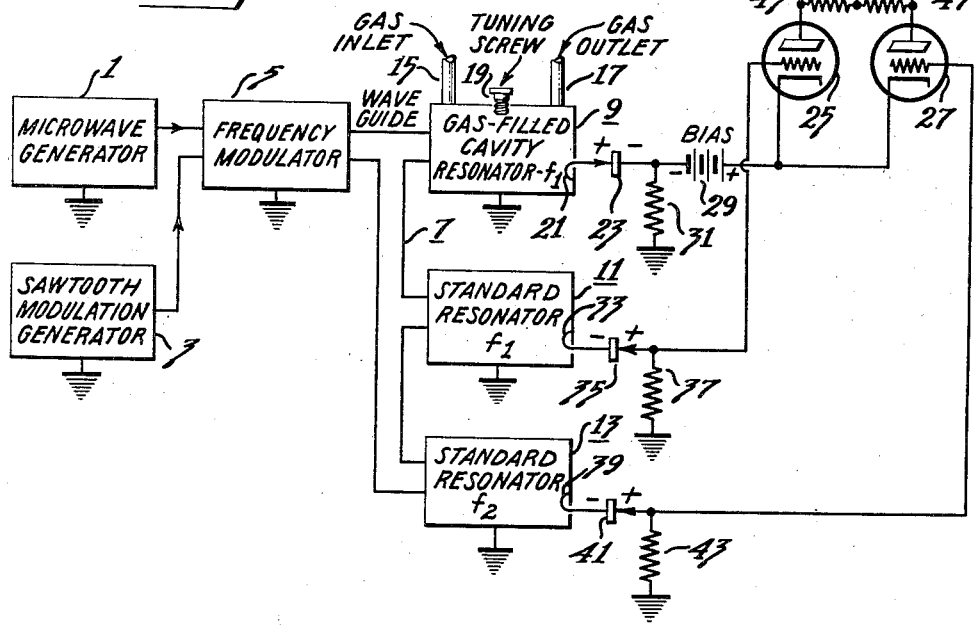
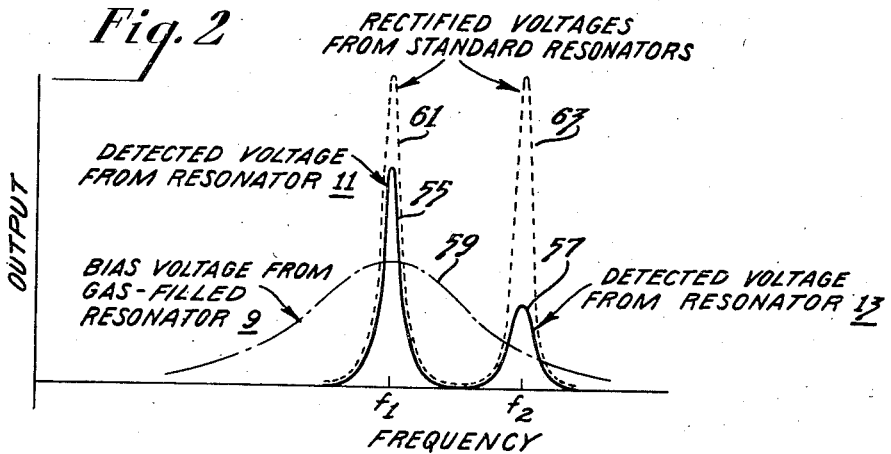
INVENTOR.
William D. Hershberger
BY
ATTORNEY Patented Dec. 28, 1948

2,457,673

UNITED STATES PATENT OFFICE 2,457,673

MICROWAVE GAS ANALYSIS

William D. Hershberger, Princeton, N. J., assignor to Radio Corporation of America, a corporation of Delaware Application November 1, 1945, Serial No. 626,134

7 Claims. (Cl. 175—183)

This invention relates generally to methods of and means for gas analysis and more particularly to improved methods and systems employing modulated microwaves for such analyses, including an improved indicating network of high sensitivity and stability.

Many gas distillation, cracking and other industrial processes require accurate analyses of various gas components encountered during the several steps of the process. The instant invention contemplates the analysis of gases by determining the selective absorption of such gases at constant pressure, as a function of pressure, for millimeter or centimeter electromagnetic waves. Such gas analysis is useful in monitoring chemical manufacturing processes as well as for indicating operating characteristics or controlling the operation of said processes.

Various gases, both inorganic such as ammonia ($NH_3$), and organic such as ethyl chloride, have been found selectively to absorb millimeter electromagnetic waves. The microwave absorption characteristic (absorption-coefficient v. frequency), of pure ammonia gas is described in an article by Cleeton and Williams in Physical Review, 45, 234 (1934). The presence of ammonia in a mixture of non-absorbing gases may be detected by observing the loss-factor of the mixture of gases at frequencies in the neighborhood of the frequency for maximum microwave absorption.

The instant invention is an improvement upon the methods and systems described in my copending U. S. application, Serial No. 596,242, filed May 28, 1945. The instant invention constitutes an improved microwave gas analyzing and indicating system to provide increased sensitivity and stability of operation.

The system may be employed for monitoring the production of ammonia by the Haber process. In this process the output of the catalyst chambers is a mixture of ammonia ($NH_3$), nitrogen ($N_2$), and hydrogen ($H_2$). The output mixture is cooled to below 38.5° C. to liquify the ammonia, while the uncombined $N_2$ and $H_2$ are again compressed to 1000 atmospheres and raised in temperature to about 600° C., thereby necessitating great expenditure of energy.

Thus, it is highly desirable to determine the ammonia concentration before refrigeration. For this simple process, a continuous sample of the gas mixture may be caused to flow continuously through a cavity resonator having definite size and Q. The resonant frequency of the cavity resonator and its Q are measured with an air dielectric or when evacuated. The presence of the microwave-absorptive gas mixture provides a change in Q of the gas-filled resonator which depends upon the percentage of ammonia which is present. This effect may be employed to warn an operator that the percentage of ammonia in the mixture is above or below predetermined marginal limits. The effect also may be employed to control the temperature, pressure, rate-of-flow, or proportions of the gas components in a continuous control process as described in detail in said copending application.

Heretofore, gas production processes have required the taking of occasional samples of the gases for chemical or spectroscopic analyses. Such analyses requires considerable time and often also require that the production process be interrupted until the analysis is completed, thus necessitating considerable delay and expense. The instant system provides continuous analyses of any desired portion of the production process, thereby permitting either manual or automatic control of the production process when the gas components deviate from predetermined marginal limits.

When more complicated gaseous mixtures are involved, such as in the manufacture of butadiene for synthetic rubber, there is always the possibility of the production of gases other than those desired. Observations by means of the instant system at a variety of frequencies for determining the loss-factor of the gas as a function of pressure may be necessary to determine the composition of such complex mixtures. However, these observations may be made continuously by means of separate cavity resonators supplied by gases at different points in the process and energized at different microwave frequencies, thus providing continuous monitoring and control.

Briefly, the invention comprises an improved method of and means for gas analysis wherein a frequency-modulated microwave generator, having output frequencies covering an extended band, is connected to three cavity resonators. One of the resonators is filled with microwave absorptive gas such as ammonia, and the gas may be continuously circulated therethrough if desired. The other two resonators are either evacuated or air-filled and are tuned to standard reference frequencies within the microwave generator frequency band. The gas-filled resonator and one of the standard resonators are tuned approximately to a frequency $f_1$ corresponding to the frequency of maximum microwave absorption of the gas employed. The third resonator is tuned to some other frequency within the generator frequency band substantially removed from the frequency of maximum microwave gas absorption. Separate crystal detectors are coupled into each of the cavity resonators to provide rectified signals corresponding to the tuning and Q of each of the resonators. The Q of the two standard reference resonators should be substantially equal. The reference resonator detectors are connected to the grid circuits of separate tube detectors and the gas-filled resonator detector is connected to the cathodes of both of said tube detectors. A balanced tube detector output circuit having a suitable indicator thus provides an indication of the difference in output voltage or current derived from the balanced tube detectors which is characteristic of the resonance characteristics and Q of the gas-filled cavity resonator. For maximum microwave absorption in the gas-filled resonator, the difference output indication will be a minimum value. For lower values of microwave absorption the difference in output between the tube detectors will increase substantially. The device thus provides an indication of microwave gas absorption of greater sensitivity and stability of operation than is provided by existing measurement systems, since the system sensitivity is substantially independent of the operating voltages and of frequency shifts in the microwave and modulation generators.

Among the objects of the invention are to provide an improved method of and means for analyzing gaseous mixtures. A second object of the invention is to provide an improved method of and means for detecting a microwave absorptive gas. Another object is to provide improved methods and means for indicating the proportions of microwave absorptive components of a gaseous mixture. An additional object is to provide improved methods of and means for measuring the loss-factor of a microwave absorptive gas as a function of gas pressure and frequency. A further object is to provide improved methods of and mean for continuously analyzing the composition of a gaseous mixture. An additional object is to provide improved methods of and means for indicating the microwave absorption characteristics of a gas enclosed within a tuned microwave device subjected to said microwaves. Another object is to provide improved methods of and means for analyzing gaseous mixtures by comparing the loss-factor of said mixture for microwave irradiation with the characteristics of standard microwave resonant devices.

The invention will be described in greater detail by reference to the accompanying drawing of which Figure 1 is a schematic block circuit diagram of a preferred embodiment thereof, and Figure 2 is a group of graphs illustrating the operating characteristics of the circuit of Figure 1. Similar reference characters are applied to similar elements throughout the drawing.

Referring to Figure 1, a microwave generator 1, and a saw-tooth modulation generator 3, are connected to a frequency modulator 5 to provide a microwave signal which varies recurrently over a desired frequency band, the microwave generator may comprise a reflex cavity type oscillator tube, such as a "Klystron" tube wherein the sawtooth modulation voltage, derived from the modulation generator 3, is applied to the electron reflecting electrode to modulate the oscillator output signal. The modulated microwaves are introduced, through conventional waveguides and suitable microwave permeable windows, into three tuned cavity resonators 9, 11, and 13. The first resonator 9 is filled with a microwave absorptive gas, such as ammonia, to be observed, and the gas may be continuously circulated through the resonator by means of inlet and outlet ports 15 and 17 which may be connected to a gas circulating system. The resonator is tuned by means of a tuning screw 19 substantially to the frequency of maximum microwave absorption for the gas under observation. The second resonator 11 is tuned substantially to the same frequency $f_1$ as the gas-filled cavity resonator 9 and includes an air dielectric, or is evacuated. The third cavity resonator 13 also has an air dielectric, or is evacuated, and is tuned to some other frequency $f_2$. All of the resonators are tuned to frequencies within the microwave frequency band generated by the modulated microwave generator. The second and third reference resonators 11 and 13 should have substantially equal high-Q characteristics.

A coupling coil 21 introduced into the gas-filled resonator 9 provides an output signal which is rectified by means of a first crystal detector 23, connected between the pick-up coil 21 and the cathodes of a pair of balanced detector-variable gain amplifier tubes 25 and 27. A fixed bias voltage for the cathodes of said tubes may be provided by a series bias battery 29 in the common cathode circuit. The crystal detector is connected to ground through a resistor 31, which also may be employed for deriving the fixed cathode bias potential due to the voltage drop therein provided by the anode current.

A second coupling coil 33 is coupled into the second cavity resonator 11 to provide output signals which are rectified by a second crystal detector 35 which is connected to the grid electrode of the first of said detector tubes 25. The second crystal detector 35 is connected to ground through a second resistor 37. Similarly a third coupling coil 39 introduced into the third cavity resonator 13 provides signals which are rectified by a third crystal detector 41 which is connected to ground through a third resistor 43.

The output or anode circuits of the detector tubes 25 and 27 are balanced by means of anode resistors 45 and 47 which are by-passed, respectively, by capacitors 49 and 51. A source of anode potential is connected to the common terminal of the anode resistors and capacitors and to ground. A meter 53 connected between the anodes of the balanced detectors 25, 27, provides an indication of the difference in output voltage derived therefrom as indicated in the solid line graphs 55 and 57 of Figure 2. The bias voltage applied to the cathodes of the detector tubes as a function of the resonant characteristics of the gas-filled resonator 9 is shown in the broken line graph 59 of Figure 2.

The dash line graphs 61 and 63 of Figure 2 indicate the rectified voltages which would be derived from the anodes of the balanced detectors 25 and 27 if the cathode voltage remained constant. However, since the cathode voltage varies as a function of the resonant characteristics of the gas-filled cavity resonator 9, the output voltages at the anodes of the tubes 25 and 27 are as indicated in graphs 55 and 57. Thus the difference in output voltage derived from the two detectors, corresponding to the difference of the integrals of the graphs 55 and 57, provides an extremely sensitive and stable indication of the Q or loss-factor of the microwave absorptive gas-filled cavity resonator 9. If desired the anodes of the balanced detector tubes 25 and 27 may be connected through series capacitors 65 and 67 to output terminals 69 and 71, respectively, for actuating other indicator or control circuits in the manner described in said copending application.

Thus the invention comprises an improved method of and means for measuring the loss-factor and Q of a microwave absorptive gas-filled cavity resonator, including an improved measuring circuit of high sensitivity and stability of operation.

I claim as my invention:

1. The method of utilizing a pair of differently tuned standard cavity resonators for measuring the energy loss in a microwave-absorptive gas-filled cavity resonator tuned approximately to the frequency of one of said standard resonators comprising the steps of introducing frequency-modulated microwave signals into all three of said resonators, detecting said microwave signals in all of said resonators, simultaneously controlling the magnitudes of said detected signals derived from said standard resonators in response to said detected signals from said gas-filled resonator, and measuring the difference in magnitude of said controlled detected signals to indicate the microwave energy loss in said microwave absorptive gas.

2. The method of utilizing a pair of differently tuned standard cavity resonators for measuring the energy loss in a microwave-absorptive gas-filled cavity resonator tuned approximately to the frequency of one of said standard resonators comprising the steps of introducing frequency-modulated microwave signals into all three of said resonators, detecting said microwave signals in all of said resonators, separately amplifying said detected signals derived from said standard resonators, simultaneously controlling the gain of said amplification of said signals in response to said detected signals from said gas-filled resonator, and measuring the difference in magnitude of said amplified detected signals to indicate the microwave energy loss in said gas-filled resonator.

3. The method of utilizing a pair of differently tuned standard cavity resonators for measuring the ratio of reactance to resistance in a microwave-absorptive gas-filled cavity resonator, comprising the steps of tuning said gas-filled resonator approximately to the frequency of one of said standard resonators, introducing frequency-modulated microwave signals into all three of said resonators, detecting said microwave signals in all of said resonators, separately amplifying said detected signals derived from said standard resonators, simultaneously controlling the gain of said amplification of said signals in response to said detected signals from said gas-filled resonator, and measuring the difference in magnitude of said amplified detected signals to indicate the microwave energy loss in said gas-filled resonator.

4. The method of utilizing a pair of differently tuned standard cavity resonators for analyzing the composition of a microwave-absorptive gas enclosed within a third cavity resonator tuned to the frequency of one of said standard resonators comprising the steps of introducing frequency-modulated signals into all three of said resonators, detecting said microwave signals in all of said resonators, separately amplifying said detected signals derived from said standard resonators, simultaneously controlling the gain of said amplification of said signals in response to said detected signals from said gas-filled resonator, measuring the difference in magnitude of said amplified detected signals, and indicating said gas composition as a function of said measured signal magnitude.

5. Apparatus for analyzing gas composition including a pair of differently tuned standard cavity resonators, a microwave-absorptive gas-filled cavity resonator tuned to the frequency of one of said standard resonators, a source of frequency-modulated microwave signals, means for introducing said frequency-modulated microwave signals into all three of said resonators, means for detecting said microwave signals in all of said resonators, means for separately amplifying said detected signals derived from said standard resonators, means for simultaneously controlling the gain of said amplification of said signals in response to said detected signals from said gas-filled resonator, and means for measuring the difference in magnitude of said amplified detected signals to indicate the microwave energy loss in said gas-filled resonator.

6. Apparatus for analyzing gas composition including a pair of differently tuned standard cavity resonators, a microwave-absorptive gas-filled cavity resonator, means for tuning said gas-filled resonator to the frequency of one of said standard resonators, a source of microwave signals, means for modulating the frequency of said signals to cyclically sweep the frequencies to which said resonators are tuned, means for introducing said frequency-modulated microwave signals into all three of said resonators, means for detecting said microwave signals in all of said resonators, means for separately amplifying said detected signals derived from said standard resonators, means for simultaneously controlling the gain of said amplification of said signals in response to said detected signals from said gas-filled resonator, and means for indicating said gas composition as a function of difference in magnitude of said amplified detected signals.

7. Apparatus for measuring the energy loss in a microwave absorptive gas, including a pair of differently tuned standard cavity resonators, a microwave-absorptive gas-filled cavity resonator tuned to the frequency of one of said standard resonators, a source of microwave signals, means for varying the frequency of said signals to sweep the frequencies to which said resonators are tuned, means for introducing said frequency-modulated microwave signals into all three of said resonators, separate signal detecting means responsive to said microwave signals in each of said resonators, separate amplifying means responsive to said detected signals derived from said standard resonators, bias voltage means connected to each of said amplifying means for simultaneously controlling the gain of said amplification of said signals in response to said detected signals from said gas-filled resonator, and means for measuring the difference in magnitude of said amplified detected signals to indicate the microwave energy loss in said gas-filled resonator.

WILLIAM D. HERSHBERGER.

REFERENCES CITED

The following references are of record in the file of this patent:

UNITED STATES PATENTS

| Number | Name | Date |
| --- | --- | --- |
| 2,404,797 | Hansen | July 30, 1946 |